Aug. 17, 1943.  A. W. GAY  2,327,259
METHOD OF FINNING
Filed Jan. 29, 1941   4 Sheets-Sheet 1

INVENTOR.
ARTHUR W. GAY
BY Adrian Wedert
ATTORNEY.

Aug. 17, 1943.   A. W. GAY   2,327,259
METHOD OF FINNING
Filed Jan. 29, 1941   4 Sheets-Sheet 2
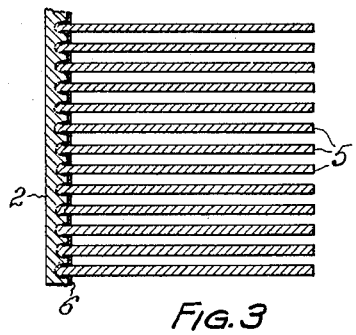
FIG. 3
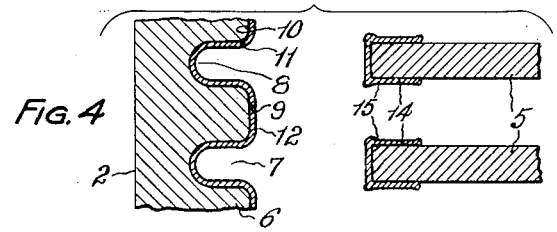
FIG. 4
FIG. 5
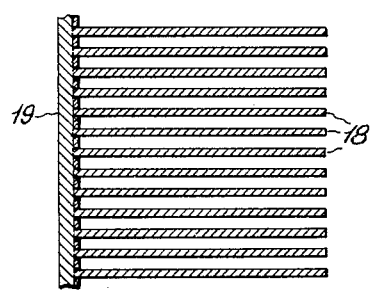
FIG. 6
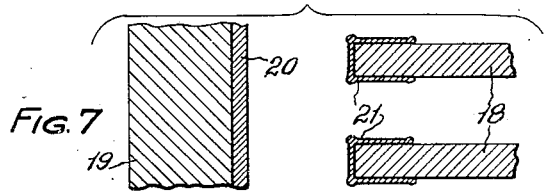
FIG. 7
FIG. 8
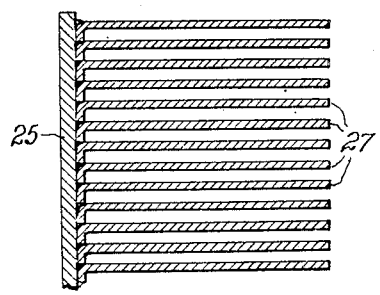
FIG. 9
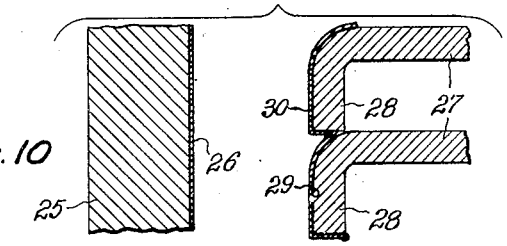
FIG. 10
FIG. 11
INVENTOR.
ARTHUR W. GAY
BY Adrian Medert
ATTORNEY.

Aug. 17, 1943.  A. W. GAY  2,327,259
METHOD OF FINNING
Filed Jan. 29, 1941  4 Sheets-Sheet 3

INVENTOR.
ARTHUR W. GAY
BY Adrian Medert
ATTORNEY.

Patented Aug. 17, 1943

2,327,259

UNITED STATES PATENT OFFICE 2,327,259

METHOD OF FINNING

Arthur W. Gay, Akron, Ohio, assignor to Edna B. Jones, Akron, Ohio

Application January 29, 1941, Serial No. 376,496

12 Claims. (Cl. 29—156.4)

This invention relates to the art of securing together articles made of different metals, and the principal object thereof is to provide a new and improved method of securing heat radiating fin members to the cylinder barrel of an air-cooled internal combustion engine. I have chosen for purpose of illustration, to describe my invention as it may be employed to secure preformed cooling fins to the exterior wall of a cylinder barrel of an air-cooled internal combustion engine of the type commonly employed in the aircraft industry, where rapid and efficient heat dissipation is required to minimize engine efficiency losses and the failure of engine parts due to operation at unduly high temperatures.

Various objects of the invention will become apparent and better understood after consideration has been given to the following detailed description of the invention taken in conjunction with the accompanying drawings wherein structure is illustrated for carrying out this invention and wherein:—

Figure 1:
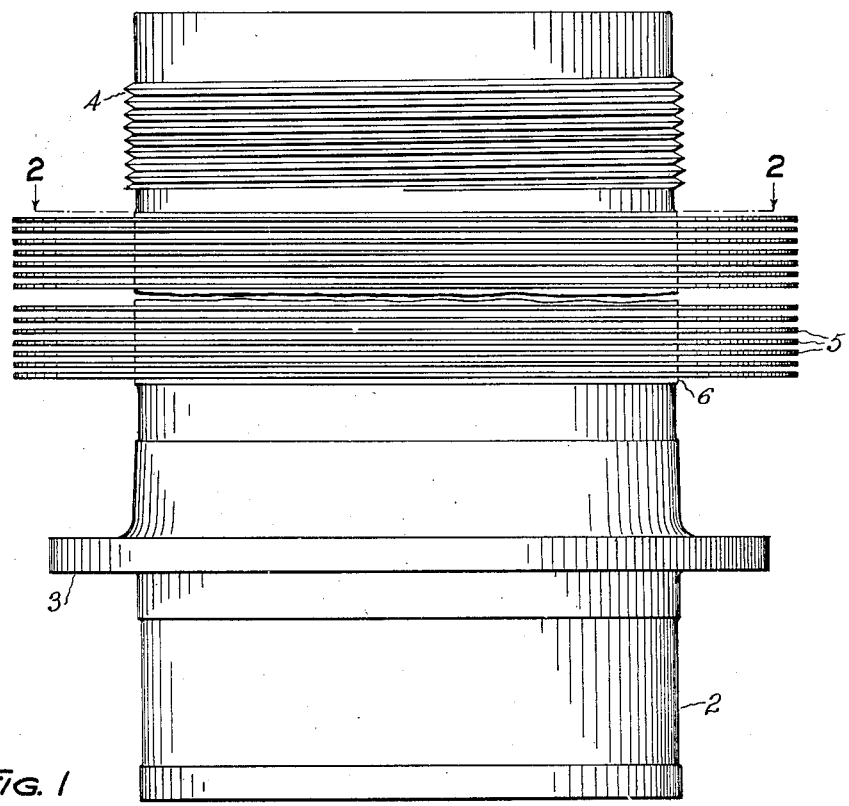
Figure 2:
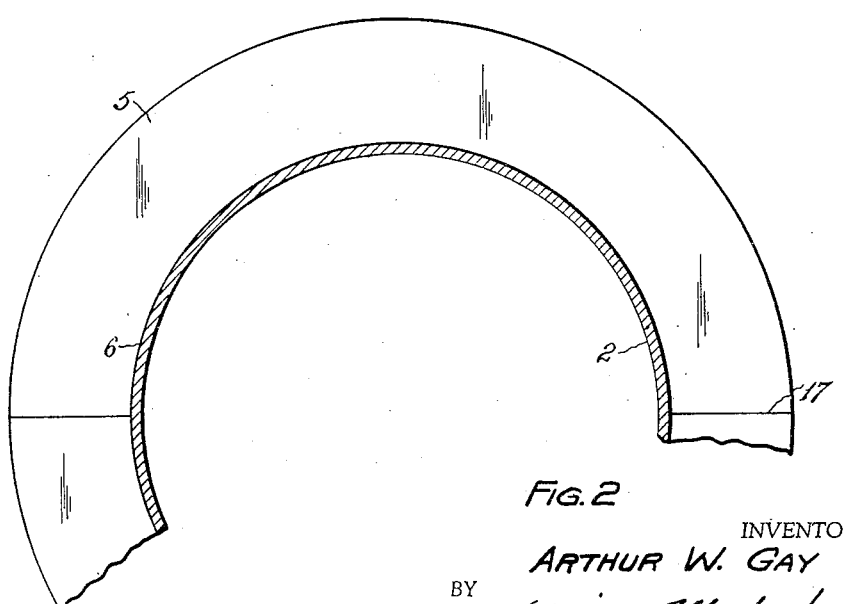
Figure 12:
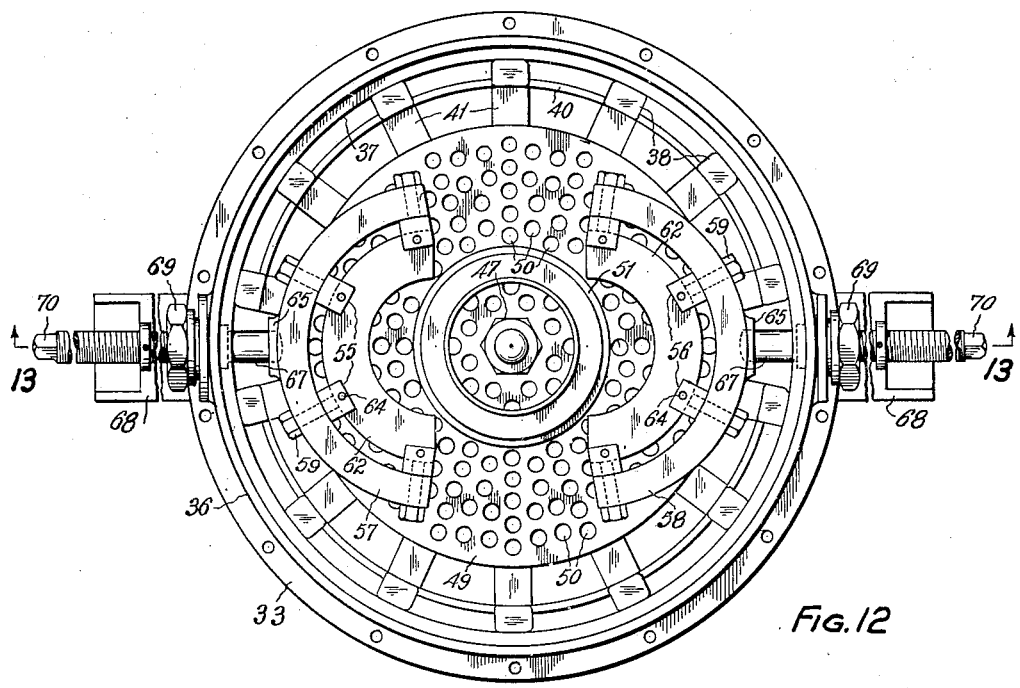
Figures 14, 15, 16:
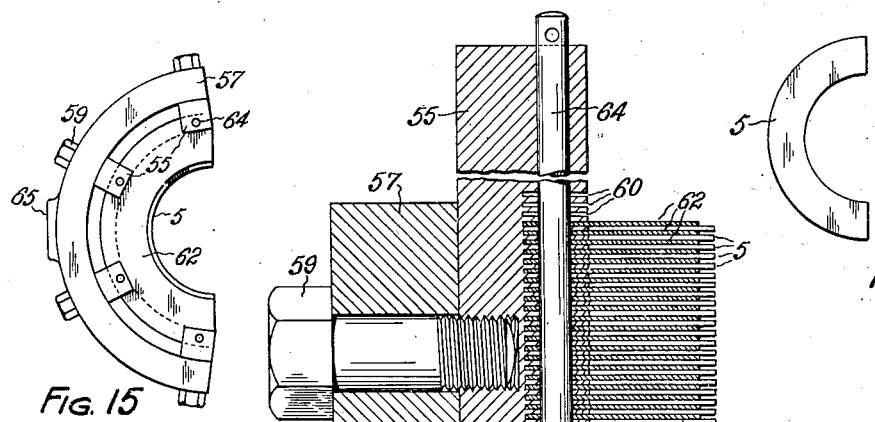
Figure 17:
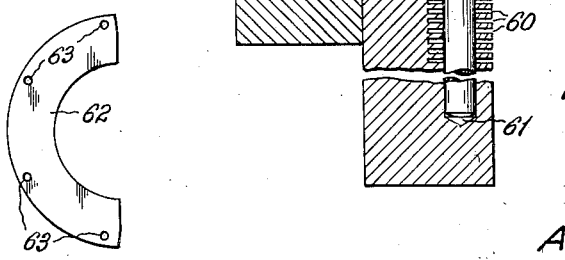
Figure 13:
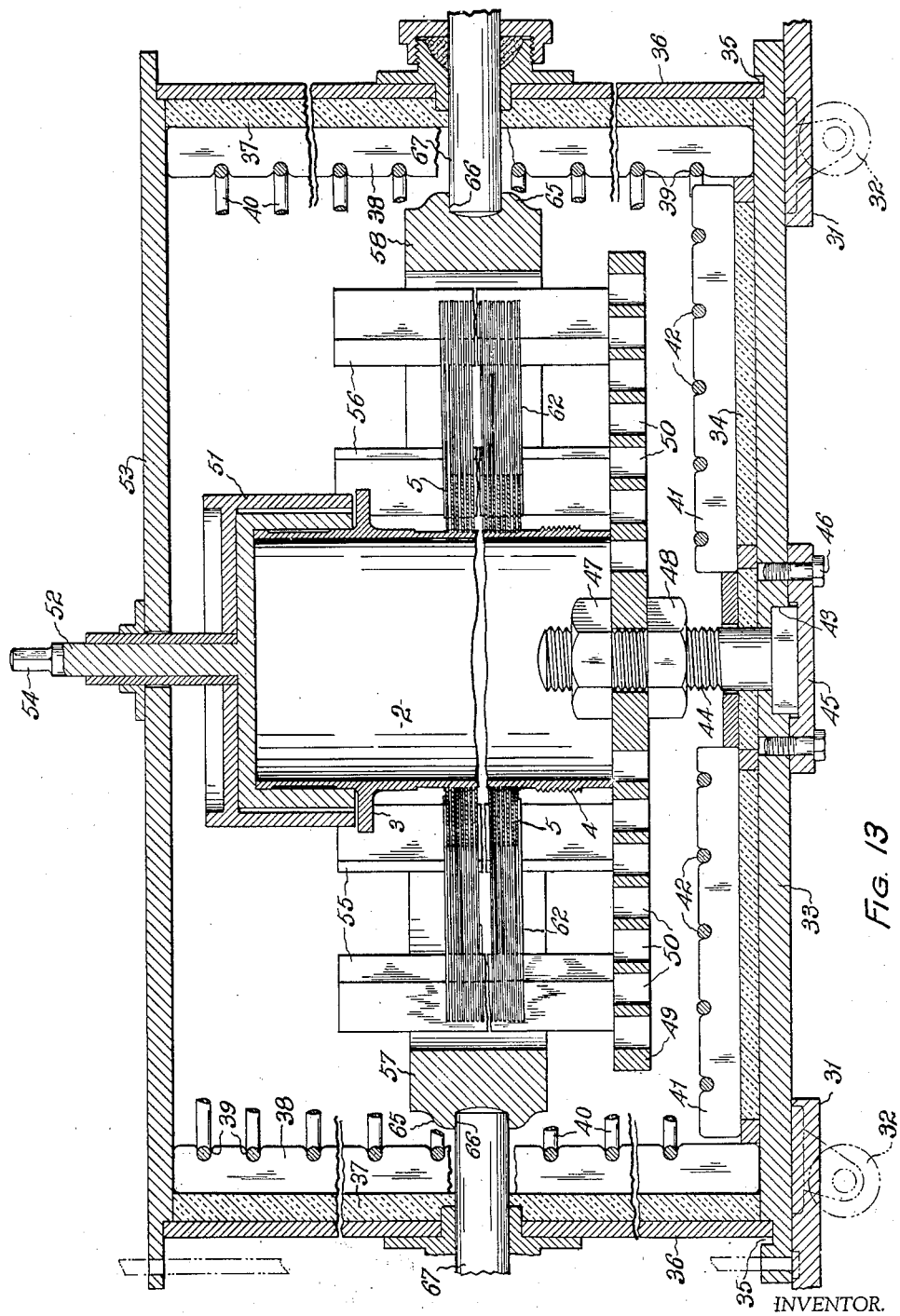

Figure 1 is a side elevational view of a cylinder barrel having a plurality of preformed cooling fins attached thereto, Figure 2 is a fragmentary sectional view taken on the line 2—2 of Figure 1, Figure 3 is a fragmentary sectional view of the side wall of a cylinder barrel, illustrating one construction of barrel and cooling fin members made in accordance with this invention, Figure 4 is an enlarged fragmentary detail, illustrating the barrel wall and fin members preparatory to joining to form the construction illustrated in Figure 3, Figure 5 is an enlarged fragmentary detail of barrel and fin members of Figure 4 after they have been joined together, Figures 6, 7 and 8 are views similar to Figures 3, 4, and 5, respectively, illustrating a modified form of the invention, Figures 9, 10 and 11 are likewise views similar to Figures 3, 4 and 5, respectively, illustrating a further modification of the invention, Figure 12 is a fragmentary top plan view, with cover removed, of the unit for assembling, heating and joining the fins to the cylinder barrel, Figure 13 is an enlarged sectional view, taken on the line 13—13 of Figure 12, Figure 14 is an enlarged sectional detail, Figure 15 is a top plan view of the fin member and spacer assembly on a reduced scale, and, Figures 16 and 17 are plan views of fin member and spacer, respectively, of Figure 15.

The present invention is directed to that method of producing a cylinder barrel for an air-cooled internal combustion engine which includes the steps of first cleaning the barrel by heating it to between 500° F. and 600° F. or until all organic and other volatile substances are removed, then cooling the barrel and polishing that portion which is to receive the fins by grinding or taking a fine lathe cut, and providing such cleaned portion of the cylinder barrel with a composite coating. This composite coating may consist of a relatively thin coating of copper over which has been placed a relatively heavy coating of zinc. The composite coating is maintained in position on the barrel and protected against oxidation during the subsequent operations, by placing thereover a protective shell of nickel. The cooling fin members are preferably made of aluminum or aluminum alloy, although other similar or suitable metal of high heat conductivity may be used equally well if desired. The inner edge portions of the aluminum fin members which are to contact the barrel are provided with a coating of zinc over which has been placed a nickel shell. The fin members are then assembled about the barrel in proper spaced relation to the barrel and to each other, and the entire assembly is heated to a relatively high temperature, preferably above the melting point of the zinc, and while at that temperature, the fin members are moved so that their inner edge surfaces contact with the wall of the barrel, and then a bond is formed therebetween having efficient thermal conductivity between the fin surfaces and the barrel.

With reference to Figures 1 and 2 of the drawings, the numeral 2 designates the cylinder barrel of an air-cooled internal combustion engine having the usual hold down flange 3 and the usual threads 4 on which the cylinder head (not shown) is threaded and shrunk in the usual manner. The outer surface of the barrel is provided with a plurality of preformed relatively thin cooling fin members 5 attached thereto. The joints between the fin members and barrel are characterized by having relatively high thermal conductivity. While it is possible to attach fins as thin as twenty-five thousandths of an inch spaced as closely together as fifty thousandths of an inch so that as many as fifty cooling fins may be attached to a four inch barrel, the number, size, and distribution of the fin members can be varied to meet the cooling requirements of the particular cylinder barrel to which it is desired that fin members be attached. The fin members may be made of any suitable metal having a high thermal conductivity, however, where lightness is an essential element in the finished article, aluminum has proven to be the most acceptable. In Figures 3 to 5, inclusive, there is illustrated a preferred form of the invention wherein the cylinder barrel 2 to which the cooling fin members 5 are to be attached is formed with a portion 6 of increased wall thickness. Relatively shallow equally spaced annular grooves 7 are formed in the wall portion 6 in number per inch equal to the number of fin members desired. The grooves 7 are of a slightly greater width than the thickness of the edge portions of the fin members which are to be inserted therein, and the bottom of the grooves thereof are rounded as at 8.

The wall portion 6 of the barrel including the grooves 7, is provided with a composite coating 9 consisting of a relatively thin layer 10 of copper placed directly on the wall of the barrel, over which a relatively heavy zinc coating 11 is placed. The thickness of the zinc plating may vary between six and fifteen thousandths of an inch, depending upon the type of metal of which the fin members are made and the surface contour of the article to which they are attached. To prevent any oxidation of the zinc coating and to maintain the same in position on the cylinder barrel during the preliminary steps prior to bonding the fin members to the barrel wall, a thin shell of nickel 12 is placed over the zinc. When the barrel 2 has been grooved and provided with the foregoing composite coating, it is ready to receive the fin members.

The fin members 5 are substantially semi-ring like in contour, the inner edges being shaped so as to seat within the grooves 7, the radius of curvature being substantially the same as or slightly less than the radius of curvature of the inner extremity of the grooves. Prior to assembling the fin members about the barrel, the inner edge portion of the fin members are treated with a coating of zinc 14 about which is placed a protective nickel shell 15.

After the fin members and barrel have been treated with the composite coatings, the fin members are assembled around the cylinder barrel and the entire assembly is introduced into an electric heating furnace where the assembled barrel and fin members are heated to a temperature of between 750° F. and 850° F. This is above the normal melting temperature of the zinc coatings, however the coatings are held in place and prevented from oxidizing by the nickel shell, while the copper coating on the cylinder barrel prevents a premature attack on the steel by the zinc.

When the fin members and barrel have been heated to the foregoing temperature, the inner edge portions of the fin members are moved into the grooves 7. When contact occurs, the nickel and copper coatings are broken, and substantially dissolved in the zinc which also slightly attacks the steel of the cylinder barrel. Sufficient pressure is applied to the fin members so that virtually all of the composite coating is extruded outwardly between adjacent fins, and an intimate contact between the inner edge of the fin member and the groove is effected. The pressure exerted causes the inner edge of the fin member to peen over and take the contour of the base of the groove, the aluminum being relatively soft and formable at this temperature. To assure that there is no insulating materials, such as oxides or inclusions, between contacting surfaces, the fins and barrel may be oscillated relative to each other, while the bonding operation takes place.

The extruded coating metal, which is substantially molten at this point in the operation, fills any space between the side walls of the grooves and the sides of the fin members and also forms a supporting strut between the walls of adjacent fin members as at 16. This strut of metal is securely bonded to the cylinder barrel 2 and to the adjacent fin members 5, thereby forming a strong joint between the fin members and the barrel. It will be seen that the zinc coating serves not only as a bonding and strengthening medium between the fin members and barrel, but also as the medium whereby the aluminum fin members are brought into intimate contact with the metal of the barrel to provide a physical bond therebetween which is free from oxides or other extraneous matter which may be a heat insulating medium at the joint. As the assembly cools, the aluminum shrinks faster than the steel, with the result that the inner edges of the fins are shrunk tightly against the outer wall of the cylinder barrel.

The edge portions 17 (see Figure 2) of the arcuate fin members are similarly treated with a composite coating and when they are brought into contact with the edge portions of a complementary fin member under heat and pressure, the edge surfaces are bonded together.

Figures 6, 7 and 8 are fragmentary illustrations of a modified finned barrel construction made in accordance with the present invention. The barrel 19 is formed with a smooth exterior surface upon which is placed a composite coating 20 of copper, zinc and nickel, similar to the coating 9 as described hereinabove.

The fin members 18 are formed with an inner periphery on a radius of curvature substantially the same as or slightly less than the radius of the outer surface of the barrel and are treated similarly to fin members 5 shown in Figure 4, with a composite coating 21 consisting of zinc with a nickel shell thereover. When so treated, the fin members and barrel are assembled and heated to the desired temperature and while so heated the fin members are caused to engage the exterior wall of the barrel. The fin members 18 are brought into contact with the barrel 19 with sufficient pressure to break through the coatings 20 and 21 and form a physical contact between the metal of the fin member and the metal of the barrel, and also to cause the edge of the fin member to flare outwardly as at 22, thereby increasing the contact with the barrel. The coating metal disposed between adjacent fin members securely bonds itself to the fin members and to the wall of the barrel and when cool securely holds the ends of the fin members to the cylinder barrel, and the shrinkage of the aluminum further serves to cause the fins to tightly bind against the cylinder barrel.

With reference to Figures 9, 10, and 11 of the drawings, there is illustrated another finned cylinder barrel construction which may be made by the method of the present invention. In this modification, greater surface contact is obtained between the fin member and the wall of the cylinder barrel. This increased contacting area provides for a freer flow of heat from the barrel to the cooling fin members. In this construction, the cylinder barrel 25 is formed and provided with a composite coating 26 in a manner similar to the cylinder barrel 19, however the thickness of the coating 26 is somewhat thinner than that employed in the prior modifications. The fin members 27 are formed with a flanged portion 28 on their inner edge, the surface 29 of the flange being contoured complemental to the exterior surface of the barrel. The outer surface areas of the flange 28 are provided with a composite coating 30 consisting of zinc with a nickel shell plated thereover.

When assembled with respect to the barrel, the flanges of the series of fin members extend in the same direction and the width of the flange then serves as a spacing medium between adjacent fin members. The same procedure of heating and contacting the fin members and barrel is followed as in the modification illustrated in Figures 6 to 8, inclusive. The coating metal on the fin members and the barrel is extruded through the space between the flanged portions of the fin members, and, together with the flanged portions of the fin members, forms a substantial muff about the cylinder barrel.

With reference to Figures 12 and 13 of the drawings, there is illustrated a device which may be employed to assemble and attach the cooling fin members to the cylinder barrel. This device comprises a base ring 31 supported on a plurality of casters or wheels 32. Mounted on the ring 31 is a base plate 33 having a layer of heat insulating material 34 disposed thereon. The surface of the plate 33 adjacent its periphery is provided with a groove 35, into which seats the lower edge of the cylindrical side wall 36 of the device, which is provided with a layer of insulating material 37 on the inner side thereof. Mounted on the inside of the wall 36 at spaced intervals, are a plurality of supports 38 having horizontally aligned notches 39 which are adapted to receive electric heating coils 40. Similarly, supports 41 extending across the bottom from the base of the side supports 38 to the center of the device serve to receive additional heating coils 42. The base plate 33 is provided with a central opening 43 through which extends a threaded stud 44. The head end of the stud is supported on a plate 45, which is secured to the underside of the base plate 33 by means of a plurality of stud bolts 46. Mounted on the threaded end of the stud 44 between a pair of adjusting nuts 47 and 48, is a supporting plate 49. The plate 49 is provided with apertures 50 to permit the free upward flow of heat from the heating coils disposed therebeneath. The plate 49 serves to support the cylinder barrel 2 and the apparatus for the aligning and moving of the fin members into contact with the wall of the cylinder barrel.

The upper end of the cylinder barrel 2 is adapted to be engaged by any suitable type of gripping mechanism 51 which may be provided with a shaft 52 extending upwardly through the cover 53 of the device. The end of the shaft 52 is provided with a tool receiving portion 54 so that the shaft may be oscillated and in turn oscillate the cylinder barrel 2 with respect to the assembled fins 5.

The fin member assembling device comprises two series of upright posts 55 and 56 which are secured to substantially semicircular rings 57 and 58 respectively, by means of bolts 59. The posts 55 and 56 have a plurality of slots 60 cut in one surface thereof, and an aperture 61 extending longitudinally of the posts, is adapted to intercept the slots 60. The slots 60 are adapted to receive the edge portions of substantially semi-ring-like spacer members 62 having openings 63 therethrough. When the edge portions of the spacers have been inserted in the slots 60, the openings 63 therein will be aligned with the vertical bore 61 of the posts. When thus assembled, a pin 64 is passed through the aligned openings 63, securing the spacer to the frame. The spacers 62 are adapted to receive therebetween, the fin members 5 after they have had their inner edge surfaces treated and preparatory to heating and moving the same into engagement with the wall of the cylinder barrel.

The rings 57 and 58 are provided with bosses 65, each having a recess 66 formed therein. The recesses 66 are adapted to receive the ends of opposed shafts 67. The shafts extend outwardly through openings in opposite sides of the wall 36 and are supported on the upper end of brackets 68. The brackets are adapted to have adjusting nuts 69 associated therewith so that rotation of the shafts 67 by means of any suitable tool engaging the ends 70 thereof, will cause the rings 57 to be moved radially across the plate 49.

While I have described my invention in detail in its present embodiments, it will be obvious to those skilled in the art, after understanding my invention, that various changes and modifications may be made therein without departing from the spirit or scope thereof as defined in the appended claims.

I claim:

1. The method of producing a ferrous metal cylinder barrel for an air-cooled internal combustion engine with aluminum cooling fins on the exterior surface thereof, which includes the steps of coating that portion of the exterior surface of a ferrous metal cylinder barrel which is to receive the cooling fins with a metal adapted to bond aluminum to itself and to ferrous metal and having a relatively low melting point as compared with ferrous metal, applying a thin metal layer over said bonding metal characterized by being non-oxidizing when heated to the melting point of the bonding metal and having a melting point above that of aluminum, coating the inner edge portions of arcuate aluminum fin members with said bonding metal, assembling a plurality of fin members in spaced relation along the barrel with the coated edge portions of the fins adjacent the barrel, heating the assembled fins and barrel to a predetermined temperature above the melting point of the bonding metal and below the melting point of aluminum, and while so heated, moving the inner edge surface of the fins against the wall of the barrel with sufficient pressure to pierce the coatings and bring the aluminum of the fin members into contact with the ferrous metal of the barrel and extrude the bonding metal outwardly between adjacent fins to form a strut therebetween.

2. The method of producing a ferrous metal cylinder barrel for an air-cooled internal combustion engine with aluminum cooling fins on the exterior surface thereof, which includes the steps of coating that portion of the exterior surface of a ferrous metal barrel which is to receive the cooling fins with a metal adapted to bond aluminum to itself and to ferrous metal and having a relatively low melting point as compared with ferrous metal, protecting said coating from oxidation and displacement with a thin layer thereover of a metal characterized by being non-oxidizing when heated to the melting point of said bonding metal and having a melting point above that of aluminum, treating the inner edge portions of arcuate aluminum fin members with said bonding metal, assembling a plurality of the fin members in spaced relation along the surface of the barrel with the treated edge portions of the fins adjacent the barrel, heating the assembled fins and barrel to a predetermined temperature above the melting point of the bonding metal and below the melting point of aluminum, and while so heated, moving the inner edge surface of the fins against the wall of the barrel with sufficient pressure to effect a contact between the aluminum of the fin members and the ferrous metal of the barrel and extruding the bonding metal outwardly between adjacent fins.

3. The method of producing a cylinder barrel for an air-cooled internal combustion engine with cooling fins on the exterior surface thereof, which includes the steps of coating that portion of the exterior surface of a ferrous metal barrel which is to receive the cooling fins with a coating metal adapted to bond aluminum to itself and to ferrous metal and having a relatively low melting point as compared with ferrous metal, protecting said coating from oxidation and displacement with a relatively thin metal coating thereover characterized by being non-oxidizing when heated to the melting point of said coating metal and having a melting point above that of aluminum, similarly treating the inner edge portions of arcuate aluminum fin members, assembling the aluminum fin members in spaced relation along the barrel with the treated edge portions of the fins adjacent to the exterior wall of the barrel, heating the assembled fins and barrel to a predetermined temperature above the melting point of the bonding metal and below the melting point of aluminum, and while so heated, moving the inner edge surface of the fins against the wall of the barrel with sufficient pressure to pierce the coatings and effect a contact between the aluminum of the edge surface of the fins and the ferrous metal of the barrel and extrude the bonding metal outwardly between adjacent fins, and relatively moving the fins and barrel to insure a contact therebetween.

4. The method of producing a cylinder barrel for an air-cooled internal combustion engine with cooling fins on the exterior surface thereof, which includes the steps of coating that portion of the exterior surface of a ferrous metal barrel which is to receive the cooling fins with a bonding metal adapted to bond aluminum to itself and to ferrous metal and having a relatively low melting point as compared with ferrous metal, applying a thin metal layer over said bonding metal characterized by being non-oxidizing when heated to the melting point of the bonding metal and having a melting point above that of aluminum, assembling arcuate aluminum fin members about said ferrous metal barrel, heating said assembly to a predetermined temperature above the melting point of the coating metal and below the melting point of aluminum, and while so heated, bringing the inner edge surfaces of the fin members against the exterior wall surface of the barrel with sufficient pressure to break the metal layer over the bonding metal and extrude the coatings from between the fins and the ferrous metal of the barrel, whereby the fins are secured to the barrel with a joint characterized by having high thermal conductivity.

5. The method of producing a ferrous metal cylinder barrel for an air-cooled internal combustion engine with aluminum cooling fins on the exterior surface thereof, which includes the steps of coating that portion of the exterior surface of a ferrous metal barrel which is to receive the cooling fins with a metal adapted to bond aluminum to itself and to ferrous metal and having a relatively low melting point as compared with ferrous metal, placing a thin metallic shell of a non-oxidizing nature when heated to the melting temperature of the bonding metal over said bonding metal to protect the same against oxidation and displacement, assembling arcuate fin members about said barrel, heating said assembly to a predetermined temperature above the melting temperature of the coating metal and below the melting point of aluminum, and while so heated, moving the inner edge surfaces of the fin members against the wall of the barrel with sufficient pressure to displace the coatings and effect a contact between the aluminum of the fin members and the ferrous metal of the barrel, whereby the said members are secured to the barrel with a joint characterized by having high thermal conductivity.

6. The method of forming a joint of high thermal conductivity between the surfaces of an aluminum part and a second part composed of a ferrous metal alloy which includes the steps of providing the surfaces to be joined with a composite coating consisting of a relatively thick layer of a bonding metal adapted to bond aluminum to itself and to ferrous metal and a thin outer shell of a metal characterized as being of a non-oxidizing nature when heated to the melting temperature of the bonding metal and having a melting point above that of aluminum, heating said metal parts to a predetermined temperature above the melting point of the bonding metal and below the melting point of aluminum, and while so heated, bringing the surfaces into contact with each other with sufficient pressure to extrude the coatings from between the engaging surfaces and effect a contact between the aluminum of the one part and the ferrous metal of the second part, whereby the aluminum part is secured to the ferrous metal part.

7. The method of producing a cylinder barrel for an air-cooled internal combustion engine, which includes the steps of providing a ferrous metal cylinder barrel with a wall portion of increased thickness, forming spaced circumferential grooves in said wall portion, coating said wall portion and grooves with a metal adapted to bond aluminum to itself and to ferrous metal and having a low melting point as compared with ferrous metal, placing a thin metallic shell of a metal characterized as being of a non-oxidizing nature when heated to the melting temperature of the bonding metal and having a melting point above that of aluminum over said bonding metal to protect the same against oxidation and displacement, similarly treating the inner edge portion of segmental aluminum fin members, assembling the aluminum fin members in spaced relation along said barrel, heating the assembly to a temperature above the melting point of the bonding metal and below the melting point of aluminum, and while so heated, moving the edge portions of the fin members into said grooves, exerting sufficient pressure on said fins to pierce the said metallic shell and extrude the bonding metal outwardly into the space between adjacent fin members and effect a contact between the aluminum of the fin members and the ferrous metal of the barrel.

8. The method of producing a cylinder barrel for an air-cooled internal combustion engine which includes the steps of providing a ferrous metal cylinder barrel with a wall portion of increased thickness, forming spaced circumferential grooves in said wall portion of increased thickness, coating said wall portion and grooves with a metal adapted to bond aluminum to itself and to ferrous metal and having a low melting point as compared with ferrous metal, placing a thin metallic shell of a metal characterized as being of a non-oxidizing nature when heated to the melting temperature of the bonding metal and having a melting point above that of aluminum over said bonding metal to protect the same against oxidation and displacement, similarly treating the inner edge portions of segmental aluminum fin members, assembling the aluminum fin members about said barrel, heating the assembly to a temperature above the melting point of the bonding metal and below the melting point of aluminum, and while so heated, moving the inner edge portions of the fin members into said grooves, exerting sufficient pressure on said fins to pierce the said metallic shell and extrude the coatings from between the engaging surfaces of the fin members and barrel to effect a contact between the aluminum of the fin members and the ferrous metal of the barrel, whereby the fin members are secured to the surface of the barrel.

9. The method of producing a cylinder barrel for an air-cooled internal combustion engine, which includes the steps of providing a ferrous metal cylinder barrel with a wall portion of increased thickness, forming spaced grooves in said wall portion, coating said wall portion and grooves with a metal adapted to bond aluminum to itself and to ferrous metal and having a low melting point as compared with ferrous metal, applying a thin metal layer over said bonding metal characterized by being non-oxidizing when heated to the melting point of the bonding metal and having a melting point above that of aluminum, assembling the inner edge portions of segmental aluminum fin members in alignment with said grooves, heating said assembled cylinder barrel and fin members to a predetermined temperature above the melting point of the bonding metal and below the melting point of aluminum, and while so heated, bringing the inner edge portion of each of the fin members into the groove aligned therewith, exerting sufficient pressure on said fins to pierce the said metallic shell and extrude the coatings from between engaging surfaces of the fin members and barrel to effect a contact between the aluminum of the fin members and the ferrous metal of the barrel, whereby the fins are secured therein.

10. The method of producing a cylinder barrel for an air-cooled internal combustion engine, which includes the steps of providing a ferrous metal cylinder barrel with a wall portion of increased thickness, forming spaced circumferential grooves in said wall portion, coating said wall portion and grooves with a bonding metal adapted to bond aluminum to itself and to ferrous metal and having a relatively low melting point as compared with ferrous metal, applying a thin metal layer over said bonding metal characterized by being non-oxidizing when heated to the melting point of the bonding metal and having a melting point above that of aluminum, assembling about the barrel segmental aluminum fin members with the inner edge portions thereof in alignment with said grooves, heating said assembled cylinder barrel and fin members to a predetermined temperature above the melting point of the bonding metal below the melting point of aluminum, while so heated, moving the inner edge portion of each of the fin members into the groove aligned therewith, and exerting sufficient pressure on said fins to pierce the said metallic shell and extrude the coatings from between engaging surfaces of the fin members and barrel to effect a contact between the aluminum of the fin members and the ferrous metal of the barrel, whereby the fins are secured therein.

11. The method of producing a cylinder barrel for an air-cooled internal combustion engine, which includes the steps of providing a ferrous metal cylinder barrel with a wall portion of increased thickness, forming spaced circumferential grooves in said wall portion, coating said wall portion and grooves with a metal adapted to bond aluminum to itself and to ferrous metal and having a relatively low melting point as compared with ferrous metal, providing a thin coating over the first coating of a metal characterized as being of a non-oxidizing nature when heated to the melting temperature of the bonding metal and having a melting point above that of aluminum, assembling about the barrel segmental aluminum fin members with the inner edge portions thereof in alignment with said grooves, heating said assembled cylinder barrel and fin members to a predetermined temperature above the melting point of the bonding metal and below the melting point of aluminum, while so heated, moving the inner edge portion of each of the fin members into the groove aligned therewith, and exerting sufficient pressure on said fins to pierce the said metallic shell and extrude the coatings from between engaging surfaces of the fin members and barrel to effect a contact between the aluminum of the fin members and the ferrous metal of the barrel, whereby the fins are secured therein.

12. The method of producing a cylinder barrel for an internal combustion engine with cooling fins on the exterior surface thereof, which includes the steps of providing a ferrous metal cylinder barrel with a wall portion of increased thickness, forming spaced circumferential grooves in said wall portion, forming a composite metal coating on said wall portion, said composite coating comprising an inner portion of a metal adapted to bond aluminum to itself and to ferrous metal and a thin outer portion of a metal characterized as being of a non-oxidizing nature when heated to the melting temperature of the bonding metal and having a melting point above that of aluminum, assembling about said barrel aluminum fin members having their inner edges formed on substantially the same radius as the base of said grooves and similarly provided with a composite metal coating, heating said assembled fin members and cylinder barrel to a temperature above the melting point of the bonding metal of said composite coating and below the melting point of aluminum, while at that temperature, moving the inner edge portions of the fin members into intimate contact with the base of the grooves and exerting sufficient pressure on said fins to pierce the said metallic shell and extrude the coating from between engaging surfaces of the fin members and barrel to effect a contact between the aluminum of the fin members and the ferrous metal of the barrel.

ARTHUR W. GAY.